UNITED STATES PATENT OFFICE.

THOMAS GAUNT, OF PEORIA, ILLINOIS.

FILTERING OIL.

SPECIFICATION forming part of Letters Patent No. 623,536, dated April 25, 1899.

Application filed October 29, 1896. Renewed August 2, 1898. Serial No. 687,568. (No specimens.)

*To all whom it may concern:*

Be it known that I, THOMAS GAUNT, of Peoria, Illinois, have invented certain new and useful Improvements in the Manufacture of Oil from Cereals, of which the following is a description.

My invention relates more particularly to the manufacture of corn-oil.

The object of the invention is to increase the clearness and brightness of appearance of the oil by an improved process of filtration.

After the germs have been separated from the starch, feed, &c., they are usually ground and the meal pressed in hydraulic presses to express the oil. The crude oil so formed may be purified and improved in appearance by proper filtration, and the object of the present invention is to perfect the filtration process, so as to produce a clearer and purer oil than has heretofore been obtainable in any commercial process of filtration with which I am acquainted and at the same time to accomplish these improved results in a most economical manner.

I have used fullers' earth, which I have added to the crude oil before filtering and then filtered in presses through duck or other strong fine fabric, and I have obtained by this means a very clear bright oil, but have found that a considerable quantity of oil is absorbed by the fullers' earth and cannot be practically recovered from it. Moreover, the expense of the fullers' earth is an objection to its use upon a large scale. I finally discovered that if the oil-cake produced by the expression of the oil in the oil-presses is ground up and introduced into the crude oil before it is filtered it seems to take up almost all the dust, dirt, and other impurities and leave the filtered oil clean and brilliant. For each hundred gallons of crude oil I introduce about ten pounds of the ground oil-cake. After the filtration the residue is a dark dirty mass, owing to the impurities which have been collected from the oil. The proportions may be widely varied, according to the purity desired and the relative value of oil and oil-cake, which may to some extent determine how much of the oil-cake it is desirable to utilize in this manner. In place of the ground oil-cake I may use some of the germ-flour before oil is expressed from it, though I prefer to use the ground oil-cake, as described.

The oil produced by this improved process of filtration with ground oil-cake is a clearer and brighter oil than any I have yet seen which has not been subjected to laboratory treatment.

What I claim, and desire to secure by these Letters Patent of the United States, is as follows:

1. The improvement in the method of purifying corn and similar oils by filtration, which consists in adding to the oil before filtering some of the finely-reduced solid portions of the material from which the oil is expressed or filtered, substantially as set forth.

2. Improvement in the manufacture of corn and similar oils, which consists in first expressing the oil from the germs, then regrinding some of the oil-cake and adding it to the oil and then filtering the oil, substantially as set forth.

In testimony whereof I have hereunto set my hand.

THOMAS GAUNT.

Witnesses:
   CARRIE M. GILL,
   JNO. L. FUELLING.